United States Patent [19]
Bergman

[11] 3,848,702
[45] Nov. 19, 1974

[54] LUBRICATING SYSTEM FOR VERTICAL MACHINE ELEMENTS

[75] Inventor: Ernest R. Bergman, Fort Loramie, Ohio

[73] Assignee: Copeland Corporation, Sidney, Ohio

[22] Filed: Oct. 2, 1972

[21] Appl. No.: 294,005

[52] U.S. Cl.............. 184/6.3, 184/6.16, 184/6.18, 308/134.1, 418/94
[51] Int. Cl............................................ F01m 7/00
[58] Field of Search.................. 184/6.3, 6.16, 6.18; 123/196 W; 308/134.1; 418/91, 94

[56] References Cited
UNITED STATES PATENTS

| | | | |
|---|---|---|---|
| 2,212,223 | 8/1940 | Barnes | 184/6.3 |
| 2,253,416 | 8/1941 | Caldwell | 308/134.1 |
| 2,905,510 | 9/1959 | Gardiner | 308/134.1 |
| 2,918,986 | 12/1959 | Leipert | 184/6.18 |
| 3,587,780 | 6/1971 | Perriman | 308/134.1 |

FOREIGN PATENTS OR APPLICATIONS

| | | | |
|---|---|---|---|
| 898,421 | 7/1949 | Germany | 308/134.1 |
| T9,060 | 4/1956 | Germany | 308/134.1 |

*Primary Examiner*—Manuel A. Antonakas
*Attorney, Agent, or Firm*—Harness, Dickey & Pierce

[57] ABSTRACT

Means for lubricating a bearing in a mechanism which is operated intermittently, the illustrated example of which is the main drive bearing of a refrigerant compressor of the type having a casing wherein lubricant normally stands at a level and wherein the refrigerant compressing mechanism and a motor for driving it are mounted in the casing above that level, the means comprising a generally vertically disposed drive shaft having a portion journaled in the bearing, means supporting the drive shaft with the drive shaft portion journaled in the bearing disposed above said level, means for rotating the drive shaft, means defining a recess within the drive shaft adjacent the bearing and defining a passage through which lubricant may flow from the recess to the bearing, lubricant pump means extending into the lubricant reservoir below said level and extending into the recess and effective to pump lubricant from the reservoir into the recess, the means defining the recess including means retaining lubricant in the recess when rotation of the pump stops and the lubricant pump means stops so that such retained lubricant may flow from the recess through the passage to lubricate the bearing when rotation of the drive shaft resumes.

10 Claims, 2 Drawing Figures

PATENTED NOV 19 1974

3,848,702

LUBRICATING SYSTEM FOR VERTICAL MACHINE ELEMENTS

BACKGROUND OF THE INVENTION

The present invention relates to improved means for lubricating bearings in mechanism which is operated intermittently, the example of which, which is illustrated and described herein, being a refrigeration compressor assembly.

It is common in refrigeration compressor assemblies to provide a main lubricant reservoir and lubricant pump means for supplying lubricant from that main reservoir to the bearing or bearings where lubricant is needed. In such systems the lubricant tends to drain away from the bearings back to the main reservoir when operation of the mechanism including the lubricant pump means stops. When operation of the mechanism resumes, there is a time delay before the lubricant pump means delivers lubricant to the bearings. Under some conditions a foaming action occurs which also interferes with immediate full oil delivery at startup. This brief period of operation without adequate lubrication, especially when repeated many times as in refrigeration compressor operation, may cause wear, seriously limiting the effective life of the mechanism.

It is, therefore, an object of the present invention to provide an improved means for lubricating a bearing which provides a small reservoir of trapped lubricant adjacent the bearing throughout each period of inoperation of the mechanism and which immediately feeds lubricant from that small reservoir to the bearing each time operation of the mechanism is initiated.

Another object of the invention is to provide such an improved means for lubricating a bearing including a drive shaft having a portion journaled in the bearing and in which the small lubricant reservoir is formed in the drive shaft adjacent the bearing and adjacent a passage through which lubricant may flow from the small reservoir to the bearing when operation of the mechanism is initiated.

It is a further object of the present invention to provide such an improved means for lubricating a bearing which is simple in design, economical of manufacture and reliable and efficient in operation.

These and other objects and advantages of the present invention will be readily apparent to those skilled in the art from a consideration of the following description, the appended claims and the accompanying drawing, wherein:

FIG. 1 is a somewhat diagrammatic vertical cross-sectional view taken through a refrigeration motor-compressor assembly incorporating the invention; and FIG. 2 is a horizontal cross-sectional view of the structure illustrated in FIG. 1 taken substantially along the line 2—2 thereof.

DESCRIPTION OF THE PREFERRED EMBODIMENT

Figure 1:
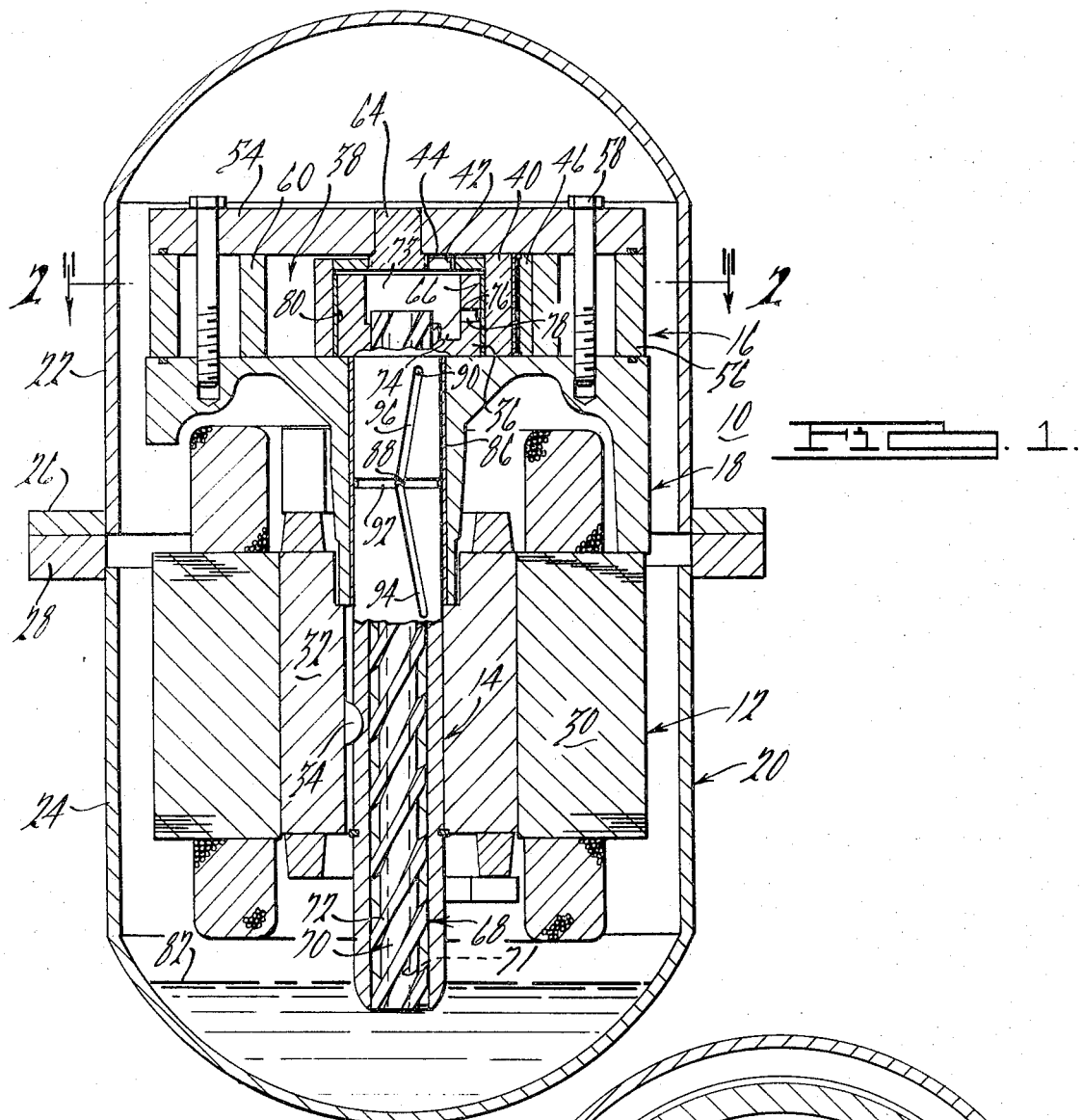

Referring now to the drawings wherein like reference characters designate like parts throughout the several views, there is shown in FIG. 1 a refrigeration motor-compressor assembly 10 embodying features of the present invention. The compressor assembly is illustrated as of the trochoidal type, and shown in its normal upstanding position, but details thereof, apart from the lubrication system, form no part of my present invention, and are of course subject to variation. The assembly comprises a bottom positioned electric motor 12, the shaft 14 of which extends upwardly to drive a compressor unit 16 supported as a unit therewith within the sealed casing 20 by suitable supporting means (not shown).

Figure 2:
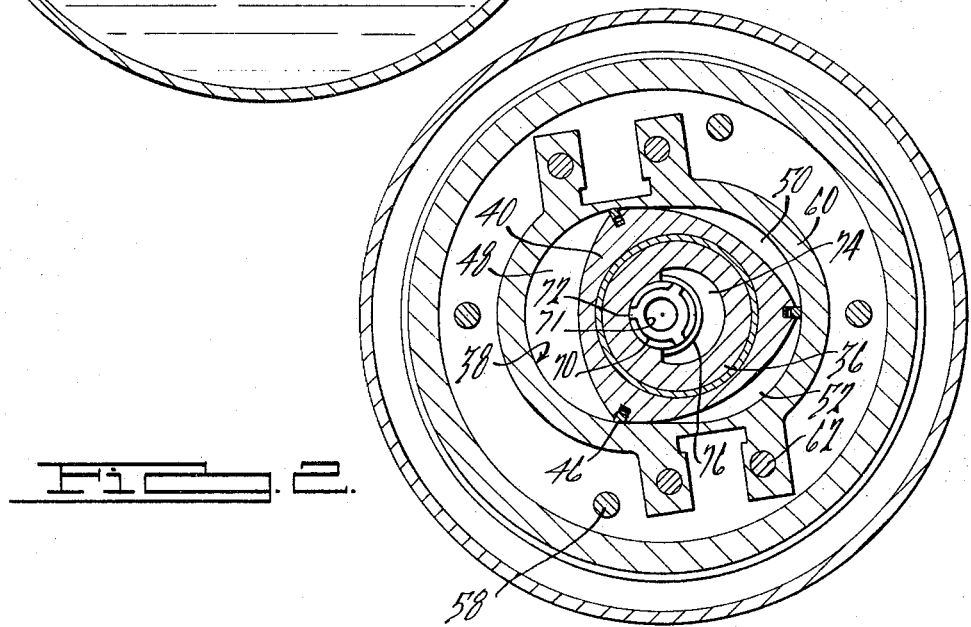

The shaft 14 is tubular and is provided with an eccentric 36 on the upper end thereof. Although the compressor 16 may be of any suitable or conventional construction, it is illustrated as of a known rotary type which has a stationary cavity 38 of epitrochoidal profile containing a single rotor or piston 40 to which an orbital and rotary movement is imparted by means of the eccentric 36 and cooperating gearing comprising an internal gear 42 fixed on the rotor 40 and a stationary sun gear 44. The rotor 40 is of generally triangular shape (FIG. 2) and mounts a seal assembly 46 at each apex thereof which seals 46 trace the internal periphery of the cavity 38 while chambers 48, 50 and 52 of changing volume are formed and rotate within the cavity 38. The axial ends of the cavity 38 are defined by the casting 18 at the bottom of the cavity 38 and by an end plate 54 at the top. It will be recognized that one or more additional units might be stacked to form a multicylinder assembly, each driven by its own eccentric, all of the eccentrics being fast on the shaft. Also, as is known, the eccentric or eccentrics may actuate conventional reciprocating pistons rather than rotary mechanisms.

The end plate 54, in the single rotary unit shown, is positioned in spaced parallel relation to the upper surface of the casting 18 by the cylindrical ring 56 and is secured in place by machine screws 58 threaded into the casting 18. The profile of the cavity 38 is defined by a cylinder body 60 which extends axially from the upper surface of the casting 18 to the under surface of the end plate 54 and is accurately held in position by pilot dowels 62.

The eccentric 36, fast on the shaft 14, has its upper end in spaced relation below the end plate 54 and the internal gear 42 on the rotor 40 overhangs the upper end of the eccentric 36. The sun gear 44 which is coaxial with the shaft and upon which the internal gear 42 rolls, has an upwardly extending shank portion 64 by which it is fixedly mounted on the end plate 54.

The rotor 40 has a bearing 66 in which the eccentric 36 is journaled. The details of the compressor 16 driven by the eccentric 36 will require no further detailed description. A compressor including three compressor sections of this rotary chamber type is shown and described in the copending application of Robert W. King entitled, "Rotary Chamber-Type Compressor," Ser. No. 193,651, filed Oct. 29, 1971 and assigned to the same assignee as the present application.

The tubular shaft 14 carries internally thereof and coaxially therewith an oil pump element 68 in the form of a tubular shaft-like wall 70 having three projecting equally spaced helical pumping ribs 72 on its surface. The pump element 68 is preferably formed of a suitable plastic material which is resistant to refrigerants and oils. It is mounted in the shaft 14 for rotation therewith, the outer surfaces of the ribs 72 having a tight fit with the interior of the shaft 14 to effectively bridge the radial space between the internal wall of the hollow shaft 14 and the external wall of the hollow cylindrical main body portion 70 of the pumping element. The ribs and cylindrical walls dip in the oil in the sump, and the direction of rotation and speed are such as to lift oil to the eccentric 36 when the compressor is operating.

The interior of the eccentric 36 is hollow, defining a cavity 73 communicating with the interior of the tubular shaft 14. The lower portion of the cavity 73 provides a depressed pocket defining an oil well 74 in which oil is retained, when the eccentric is not turning, by a shallow dam 76 between the well 74 and the tubular shaft 14.

The eccentric 36 is provided with a horizontal oil feed hole 78 extending through its wall at the maximum throw position and slightly above the top of the dam 76, arranged to conduct oil to the bearing surface between the eccentric 36 and shell 66, aided by an annular oil groove 80 on the exterior of the eccentric. The upper end of the oil pump element 68 is disposed above the top of the dam 76 and substantially at the level of the oil hole 78. The hole 78 is below the height to which oil trapped in the well 74 would rise against the wall, under the effect of centrifugal force, upon startup, even if no additional oil were supplied by the oil pumping means.

The rotation of the pump element 68 with the shaft 14 causes oil to rise through the helical channels between the ribs 72 from the oil sump 82 in the lower shell portion 24 of the casing. Oil leaving the upper end of the pump element 68 is forced out by centrifugal force through the oil hole 78 to lubricate the bearing 66. The oil well 74 in the eccentric serves the important function of maintaining a supply of oil in the eccentric 36 when the operation of the compressor assembly 10 stops so that upon each start up of the compressor assembly 10 there is always oil in the eccentric 36 immediately available to flow through the oil hole 78 under the effect of centrifugal force. This provides lubrication for the bearing 66 before the pump element 68 has had time to supply oil to the oil reservoir 74, and even if the foaming condition which sometimes occurs upon startup interferes with immediate oil delivery by the pumping ribs 72. The importance of this immediate lubrication of the bearing 66 at each startup of the compressor assembly 10 in reducing wear and increasing life will be readily appreciated. When the compressor assembly 10 is operating, any excess oil delivered to the cavity 73 above the level of the top of the pump element 68 may return to the main reservoir 82 in the bottom of the casing 20, flowing downwardly through the hollow interior 71 of the tubular wall portion 70 of the pumping element 68. When the compressor assembly 10 stops operation, any excess oil in the cavity 73 above the level of dam 76 may also return to the sump 82 by flowing downwardly between ribs 72, the amount of oil retained in the small reservoir 74 being determined by the height of the dam 76.

Immediately below the eccentric 36 the shaft 14 journaled in a bearing 86 in the casting 18. To supply oil to this bearing the shaft 14 has oil holes 88 and 90 and oil grooves 92, 94 and 96.

While only one specific embodiment of the invention has been illustrated and described in detail herein, it will be readily appreciated that numerous modifications and changes may be made without departing from the spirit of the present invention or the proper scope of the subjoined claims.

I claim:

1. In combination, means providing a main lubricant reservoir wherein lubricant normally stands at a level, a generally vertically disposed drive shaft having a journal, means supporting said drive shaft with said journal disposed above said level, and providing a bearing for said journal, means for rotating said drive shaft, means for lubricating said bearing comprising means defining a recess within said drive shaft adjacent said bearing and defining a passage through which lubricant may flow from said recess to said bearing driving rotation of said drive shaft, lubricant pump means extending into said main lubricant reservoir below said level and extending into said recess and effective to pump lubricant from said main lubricant reservoir into said recess, said means defining said recess including means retaining lubricant therein when rotation of said drive shaft stops and said lubricant pump means stops so that such retained lubricant may flow therefrom through said passage to lubricate said bearing when rotation of said drive shaft resumes, said recess communicating with the interior of said tubular drive shaft and said means for retaining lubricant within said recess comprising a dam between said recess and the interior of said tubular drive shafting.

2. The combination defined in claim 1 wherein said lubricant pump means extends into said recess to a point above said dam.

3. The combination defined in claim 2 wherein said passage communicates with said recess at a point above said dam.

4. The combination defined in claim 1 wherein said lubricant pump means comprises a cylindrical member having at least one helix on the outer surface thereof.

5. The combination defined in claim 4 wherein said member has an opening extending axially therethrough through which excess lubricant may return from said recess to said main lubricant reservoir.

6. In a refrigerant motor-compressor assembly of the type having a casing wherein lubricant normally stands at a level to define a lubricant reservoir and having refrigerant compressing mechanism in an upper portion thereof, and a motor for driving said mechanism mounted in a lower portion of said casing, said mechanism extending above said level, a generally vertically disposed drive shaft adapted to be driven by said motor and having a passage therein through which lubricant may flow from said reservoir to said mechanism during rotation of said drive shaft, lubricant pump means extending into said reservoir below said level and effective to pump lubricant from said reservoir upwardly through said passage, said mechanism including an eccentric secured to the top portion of the shaft and a bearing within the eccentric is rotatable, said eccentric having a cavity therein for retaining lubricant when rotation of said drive shaft stops and said lubricant pump means stops, and a second passage connecting said cavity to the bearing so that such retained lubricant may flow through said second passage to lubricate said bearing when rotation of said drive shaft resumes.

7. The combination defined in claim 6 wherein said cavity communicates with the passage in the shaft and said means for retaining lubricant within said cavity comprises a dam portion between such passage and the bottom of the cavity and another dam portion between the bottom said cavity and the second passage.

8. The combination defined in claim 7 wherein said lubricant pump means extends into said cavity to a point above said first-mentioned dam.

9. The combination defined in claim 8 wherein said lubricant pump means comprises a cylindrical member having at least one helix on the outer surface thereof.

10. The combination defined in claim 9 wherein said member has an opening extending axially therethrough open at its top and the wall of which defines a third dam higher than the first-mentioned dam, and through which opening excess lubricant may return from said cavity to said main lubricant reservoir.

* * * * *

UNITED STATES PATENT OFFICE
CERTIFICATE OF CORRECTION

Patent No. 3,848,702  Dated Nov. 19, 1974

Inventor(s) Ernest R. Bergman

It is certified that error appears in the above-identified patent and that said Letters Patent are hereby corrected as shown below:

Col. 4, line 52 (Claim 6, line 16),
after "within" insert --which--.

Signed and sealed this 18th day of February 1975.

(SEAL)
Attest:

RUTH C. MASON
Attesting Officer

C. MARSHALL DANN
Commissioner of Patents
and Trademarks